United States Patent
Auker et al.

(10) Patent No.: US 10,513,986 B2
(45) Date of Patent: Dec. 24, 2019

(54) COUNTER-ROTATING ELECTRIC GENERATOR IN TURBINE ENGINE

(71) Applicant: Rolls-Royce North American Technologies, Inc., Indianapolis, IN (US)

(72) Inventors: Bradley Eugene Auker, Coatesville, IN (US); Edward Claude Rice, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 414 days.

(21) Appl. No.: 15/286,185

(22) Filed: Oct. 5, 2016

(65) Prior Publication Data

US 2018/0094589 A1  Apr. 5, 2018

(51) Int. Cl.
| | |
|---|---|
| *F02C 7/32* | (2006.01) |
| *F02C 7/36* | (2006.01) |
| *F01D 15/10* | (2006.01) |
| *F02C 6/00* | (2006.01) |
| *F01D 15/00* | (2006.01) |
| *B64D 41/00* | (2006.01) |

(52) U.S. Cl.
CPC ............... *F02C 7/32* (2013.01); *F01D 15/00* (2013.01); *F01D 15/10* (2013.01); *F02C 6/00* (2013.01); *F02C 7/36* (2013.01); *B64D 41/00* (2013.01); *F05D 2220/76* (2013.01); *F05D 2250/44* (2013.01); *F05D 2260/40311* (2013.01)

(58) Field of Classification Search
CPC .... F02C 7/32; F02C 7/36; F05D 2260/40311; F05D 2220/76; F01D 15/10
See application file for complete search history.

(56) References Cited

U.S. PATENT DOCUMENTS

| | | | |
|---|---|---|---|
| 4,260,944 | A | 4/1981 | O'Mahony |
| 6,201,331 | B1 | 3/2001 | Nakano |
| 6,249,058 | B1 | 6/2001 | Rea |
| 6,710,492 | B2 | 3/2004 | Minagawa |

(Continued)

FOREIGN PATENT DOCUMENTS

| | | |
|---|---|---|
| CN | 102290936 A | 12/2011 |
| EP | 0065855 A1 | 5/1982 |

(Continued)

OTHER PUBLICATIONS

U.S. Appl. No. 15/286,165, by Bradley Eugene Auker et al., filed Oct. 5, 2016.

(Continued)

*Primary Examiner* — Scott J Walthour
*Assistant Examiner* — Todd N Jordan
(74) *Attorney, Agent, or Firm* — Shumaker & Sieffert, P.A.

(57) ABSTRACT

A turbine engine is described that includes a drive shaft and an electric generator comprising a first rotating element comprising a magnet array, wherein the first rotating element is configured to rotate in a first direction based on a rotation of the drive shaft. The turbine engine further includes a second rotating element comprising a coil array, wherein the second rotating element is configured to rotate in a second direction based on the rotation of the drive shaft, wherein the second direction is opposite to the first direction.

15 Claims, 5 Drawing Sheets

(56) References Cited

U.S. PATENT DOCUMENTS

| | | |
|---|---|---|
| 7,982,351 B2 | 7/2011 | Atallah et al. |
| 8,063,527 B2 | 11/2011 | Qu et al. |
| 8,222,784 B2 | 7/2012 | Serra et al. |
| 8,624,415 B2 | 1/2014 | Koenig |
| 8,803,354 B2 | 8/2014 | Wamble, III et al. |
| 2006/0066110 A1 | 3/2006 | Jansen et al. |
| 2006/0071575 A1 | 4/2006 | Jansen et al. |
| 2006/0163963 A1 | 7/2006 | Flores, Jr. |
| 2007/0086132 A1 | 4/2007 | Ravera et al. |
| 2008/0197730 A1 | 8/2008 | Himmelmann et al. |
| 2009/0015011 A1* | 1/2009 | Colin .................. F01D 15/10 290/52 |
| 2009/0072645 A1 | 3/2009 | Quere |
| 2009/0289516 A1 | 11/2009 | Hopewell et al. |
| 2010/0207474 A1 | 8/2010 | Osada et al. |
| 2010/0326050 A1 | 12/2010 | Schilling et al. |
| 2011/0024567 A1 | 2/2011 | Blackwelder et al. |
| 2012/0319661 A1* | 12/2012 | Moore .................. F16H 3/724 322/40 |
| 2013/0181562 A1 | 7/2013 | Gieras et al. |
| 2013/0187501 A1 | 7/2013 | Theobald et al. |
| 2013/0228654 A1 | 9/2013 | Aubert et al. |
| 2015/0042186 A1 | 2/2015 | Galvan |
| 2015/0176560 A1 | 6/2015 | Harris |
| 2015/0207377 A1 | 7/2015 | Linares |
| 2015/0315980 A1 | 11/2015 | Edwards et al. |
| 2016/0087517 A1 | 3/2016 | Powell et al. |
| 2017/0104398 A1 | 4/2017 | Peng et al. |
| 2017/0126159 A1* | 5/2017 | Spierling .................. F16H 1/28 |
| 2018/0003276 A1 | 1/2018 | Jebari |
| 2018/0058243 A1* | 3/2018 | Auker .................. F01D 15/10 |
| 2018/0094589 A1 | 4/2018 | Auker et al. |
| 2018/0097427 A1* | 4/2018 | Auker .................. H02K 16/02 |

FOREIGN PATENT DOCUMENTS

| | | |
|---|---|---|
| EP | 2727840 A2 | 5/2014 |
| WO | 2013099008 A1 | 7/2013 |
| WO | 2014150377 A1 | 9/2014 |
| WO | 2016/072834 A2 | 5/2016 |

OTHER PUBLICATIONS

Response to Extended Search Report dated Feb. 15, 2018, from counterpart European Application No. 17189408.2, filed Oct. 9, 2018, 38 pp.

Examination Report from counterpart European Application No. 17189408.2, dated Feb. 14, 2019, 6 pp.

Response to the Examination Report from counterpart European Application No. 17189408.2 dated Feb. 14, 2019, filed Jun. 11, 2019, 35 pp.

Extended Search Report from counterpart European Application No. 17189408.2, dated Feb. 15, 2018, 9 pp.

\* cited by examiner

COUNTER-ROTATING ELECTRIC GENERATOR IN TURBINE ENGINE

TECHNICAL FIELD

This disclosure relates to the generation of electricity in turbine engines.

BACKGROUND

A turbine engine is a type of internal combustion engine that may drive an electric generator for converting mechanical power produced by the turbine engine to electrical power used by other components of a system. Some electric generators may include a rotor and a stator with the rotor configured to rotate and the stator configured to remain stationary. The electric generator may also include a small gap between the rotor and the stator. As the angular velocity of the rotor increases, the rotor may deflect away from the stator, which may increase the gap between the rotor and the stator. An increase in the gap between the rotor and the stator may result in a decrease in the amount of electrical current produced by the electric generator.

SUMMARY

In some examples, the disclosure describes a turbine engine includes a drive shaft and an electric generator comprising a first rotating element comprising a magnet array, wherein the first rotating element is configured to rotate in a first direction based on a rotation of the drive shaft. The turbine engine further includes a second rotating element comprising a coil array, wherein the second rotating element is configured to rotate in a second direction based on the rotation of the drive shaft, wherein the second direction is opposite to the first direction.

In some examples, the disclosure describes a method including receiving, at a first rotating element of an electric generator of a turbine engine, via a drive shaft of the turbine engine, first mechanical power to cause the first rotating element to rotate in a first direction. The method further includes receiving, at a second rotating element of the electric generator, via the drive shaft, second mechanical power to cause the second rotating element to rotate in a second direction that is opposite to the first direction. The method further includes generating, at a coil array of the second rotating element and based on the first mechanical power and the second mechanical power, an electrical current. The method further includes outputting, by an electrical output element of the electric generator, to an electrical load, the electrical current.

In some examples, the disclosure describes an electric generator module comprising a first rotating element comprising a magnet array and configured to mechanically couple to a drive shaft of the turbine engine, receive first mechanical power from the drive shaft, and rotate in a first direction based on a rotation of the drive shaft. The electric generator module further comprises a second rotating element comprising a coil array and configured to mechanically couple to the drive shaft, receive second mechanical power from the drive shaft, and rotate in a second direction based on a rotation of the drive shaft, wherein the second direction is opposite to the first direction. The electric generator module further comprises an electrical output element configured to output an electrical current produced by the coil array to an electrical load.

The details of one or more examples are set forth in the accompanying drawings and the description below. Other features, objects, and advantages will be apparent from the description and drawings, and from the claims.

DETAILED DESCRIPTION

In general, this disclosure describes techniques for implementing an electric generator that is configured to generate, using two counter-rotating elements, an electrical current. For example, the electric generator may include a rotating magnet array and a rotating coil array that rotates counter to the rotating magnet array. By configuring the two rotating elements to counter-rotate, any deflection between the two rotating elements may decrease even as the angular velocity of the magnet array relative to the coil array increases.

An electric generator with a rotating magnet array and a counter-rotating coil array may operate at angular velocities with less deflection, as compared to an electric generator with a single rotating element. In some examples, the electric generator may produce a higher electrical current, as compared to a conventional electric generator with a single rotating element and a similar relative angular velocity because the deflection of an electric generator may affect the strength of the electrical current. Therefore, the example generator may operate at a desirable relative angular velocity with reduced concerns about the deflection of the rotating elements, as compared to other generators with stationary coil arrays.

Figure 1:
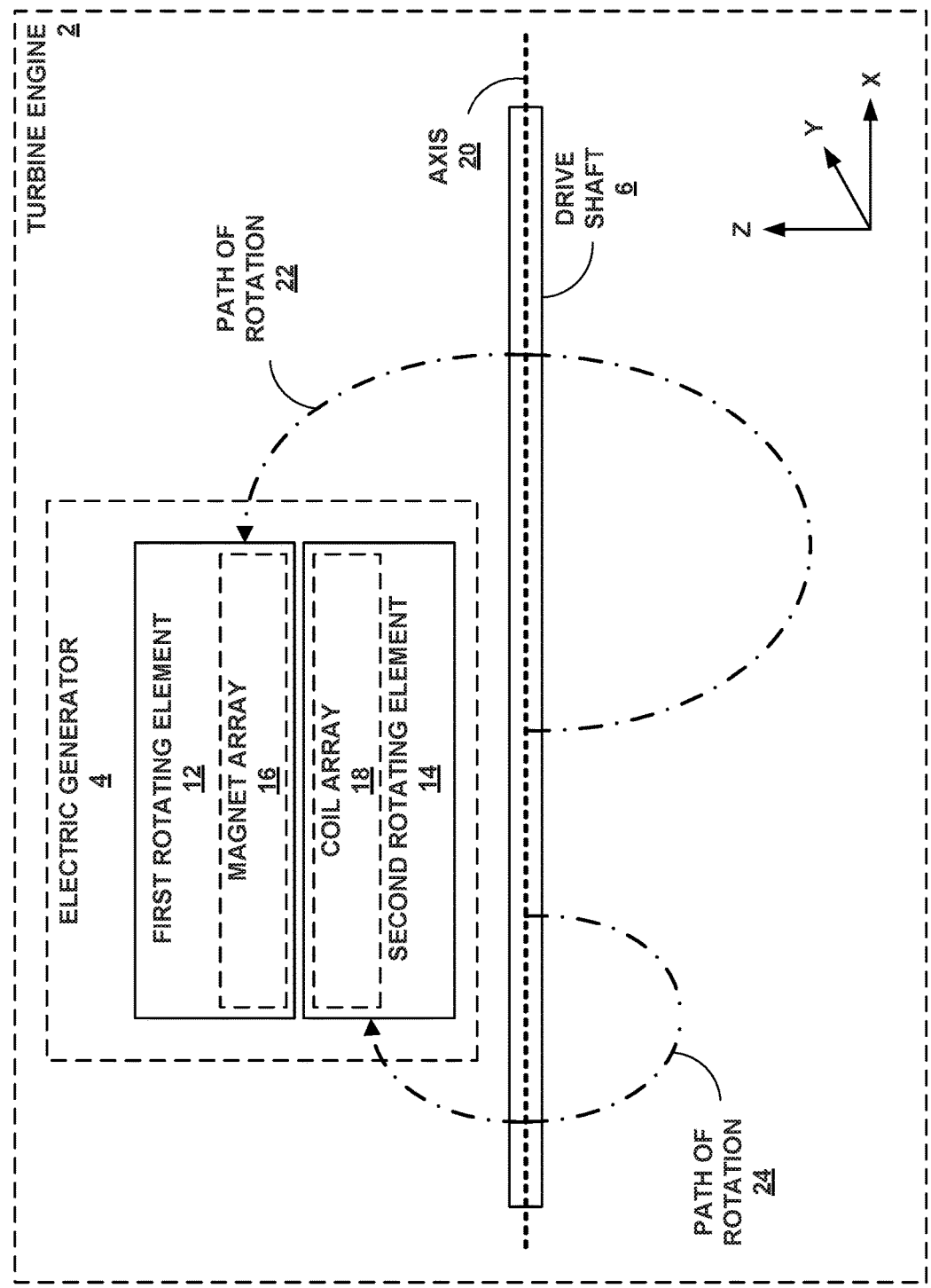
FIG. 1 is a conceptual diagram illustrating a turbine engine including an electric generator with two counter-rotating elements, in accordance with one or more techniques of this disclosure.

FIG. 1 is a conceptual diagram illustrating a turbine engine 2 including an electric generator 4 with two counter-rotating elements 12, 14, in accordance with one or more techniques of this disclosure. Turbine engine 2 may be configured to convert one form of power to mechanical energy in the form of a rotating turbine. The mechanical energy produced by turbine engine 2 may be used in a variety of ways or for a variety of systems and applications (e.g., aircraft, locomotives, watercraft, power plants, electric generators, and any or all other systems and applications that rely on mechanical energy from a turbine engine to perform work).

Turbine engine 2 may include electric generator 4, and drive shaft 6, plus additional components not shown in FIG.

1. Turbine engine 2 may include a gas turbine engine, a nuclear turbine engine, a steam turbine engine, or any other suitable turbine engine. Turbine engine 2 may reside within a three-dimensional space represented by X, Y, and Z directions, as shown in FIG. 1. For example, drive shaft 6 may extend in the X direction, where the X-Y plane represents a horizontal plane. The Y direction may be at least partially into and out of the page in FIG. 1. As used herein, "top" or "upper" may refer to the positive Z direction, and "bottom" or "lower" may refer to the negative Z direction.

Drive shaft 6 is configured to rotate based on the rotation of a turbine in turbine engine 2. In some examples, drive shaft 6 may include a low-pressure (LP) shaft that is mechanically coupled to an LP turbine or an auxiliary shaft mechanically coupled to the LP shaft of turbine engine 2. The LP shaft may be a longer shaft than a high-pressure (HP) shaft of turbine engine 2 and may extend through a cooler section of turbine engine 2, as compared to the temperature of a section including the HP shaft. In some examples, one of rotating elements 12, 14 may be mechanically coupled to the LP shaft or an auxiliary shaft coupled to the LP shaft, and the other of rotating elements 12, 14 may be mechanically coupled to the HP shaft or an auxiliary shaft coupled to the HP shaft.

Drive shaft 6 may be oriented in a horizontal direction, which is represented by the X direction in FIG. 1. The rotational velocity of drive shaft 6 may depend on the diameter of drive shaft 6 and the size of turbine engine 2. Although FIG. 1 depicts drive shaft 6 as passing through rotating element 12 and magnet array 16, drive shaft 6 may be mechanically coupled to both of rotating elements 12, 14. Several components in turbine engine 2 may be mechanically coupled to tower shaft 6, such as a fuel pump and/or a hydraulic pump.

Electric generator 4 is configured to convert mechanical power to electrical power for use by other components or circuits. Electric generator 4 may include a direct-current (DC) generator or an alternating-current (AC) generator such as an induction generator. Electric generator 4 may include Halbach array generator with permanent magnets on a rotor. A Halbach array is an array of magnets that cancels, or nearly cancels, the magnetic field on one side of the array.

Electric generator 4 may include rotating elements 12, 14, each of which may be configured to rotate about axis 20 coaxial with drive shaft 6, which may pass through the center of drive shaft 6. Each of rotating elements 12, 14 may be referred to as a "rotor." In some examples, rotating element 14 may be referred to as a "coil support frame" or an "armature." In some examples, electric generator 4 may include additional rotating elements, such as a third rotating element with a magnet array on a side of rotating element 14 that is opposite rotating element 12. The magnet array of the third rotating element (not shown in FIG. 1) may generate an electrical current in a second coil array that may be positioned inside of rotating element 14.

Rotating element 12 may include magnet array 16. Magnet array 16 may include at least one magnetic element, such as a permanent magnet and/or a field coil configured to operate as an electromagnet. Rotating element 12 and magnet array 16 may rotate about axis 20 along path of rotation 22 at a particular angular velocity. The angular velocity of one of rotating elements 12, 14 may be the amount of rotation of that rotating element in a period of time, possibly expressed as revolutions per minute or radians per second. The angular velocity of rotating element 12 may affect the deflection of all or part of rotating element 12. As the angular velocity of rotating element 12 increases, the deflection of rotating element 12 may increase. Certain portions of rotating element 12, such as the portions that are further from axis 20 or further from a mechanical coupling to drive shaft 6, may experience greater deflection than other portions of rotating element 12, such as the portions that are closer to axis 20 or closer to a mechanical coupling to drive shaft 6.

Rotating element 14 may include magnet array 18. Coil array 18 may include an electrical winding, through which electrical current may flow. Each coil element of coil array 18 may produce an electrical current with a frequency and a phase based on the electromagnetic fields generated by the magnetic elements of magnet array 16.

Rotating element 14 and coil array 18 may rotate about axis 20 along path of rotation 24 at a particular angular velocity. The angular velocity of rotating element 14 may affect the deflection of all or part of rotating element 14. As the angular velocity of rotating element 14 increases, the deflection of rotating element 14 may increase. Certain portions of rotating element 14, such as the portions that are further from axis 20 or further from a mechanical coupling to drive shaft 6, may experience greater deflection than other portions of rotating element 14, such as the portions that are closer to axis 20 or closer to a mechanical coupling to drive shaft 6.

In some examples, coil array 18 may be configured to produce single-phase alternating current (AC) electrical current. Coil array 18 may output the electrical current to a power conversion circuit, a power bus, and/or an electrical load. Electric generator 4 may further include an electrical output element configured to deliver the electrical current to an electrical load. If the electrical load operates on a specific frequency or phase of electrical current, one or more optional power converters may convert the electrical current produced by coil array 18 to the specific frequency and phase of electrical current required by the electrical load. The one or more optional power converters may be located inside or outside of turbine engine 2.

In accordance with the techniques of this disclosure, rotating element 12 may rotate about axis 20 in a direction that is opposite to the rotation of rotating element 14. Rotating elements 12, 14 may rotate in opposite directions coaxial with drive shaft 6 to produce a relative angular velocity between rotating elements 12, 14 that is higher than the angular velocity of either of rotating elements 12, 14. The gyroscopic moment of each of rotating elements 12, 14 may partially or fully cancel out the gyroscopic moment of the other rotating element if rotating elements 12, 14 are rotating in opposite directions. The deflection of a portion of either of rotating elements 12, 14 may be proportional to the square of the tangential velocity at the portion of that rotating element. Thus, electric generator 4 may achieve a similar relative angular velocity, as compared to other electric generators with a single rotating element, but each of rotating elements 12, 14 may experience seventy-five percent less deflection. Consequently, turbine engine 2 may operate drive shaft 6 at a slower and more desirable speed while achieving the desirable relative velocity for electric generator 4.

The electrical current produced by electric generator 4 may be based at least in part on the gap between each of rotating elements 12, 14. In some examples, there may be a gap between each of rotating elements 12, 14 of approximately one millimeter. As each of rotating elements 12, 14 rotate about axis 20, each of rotating elements 12, 14 may deflect away from the other rotating element, thereby increasing the gap between rotating elements 12, 14. If each of rotating elements 12, 14 rotates about axis 20, electric generator 4 may experience less deflection than other electric generators with the same relative angular velocity and a single rotating element.

Figure 2:
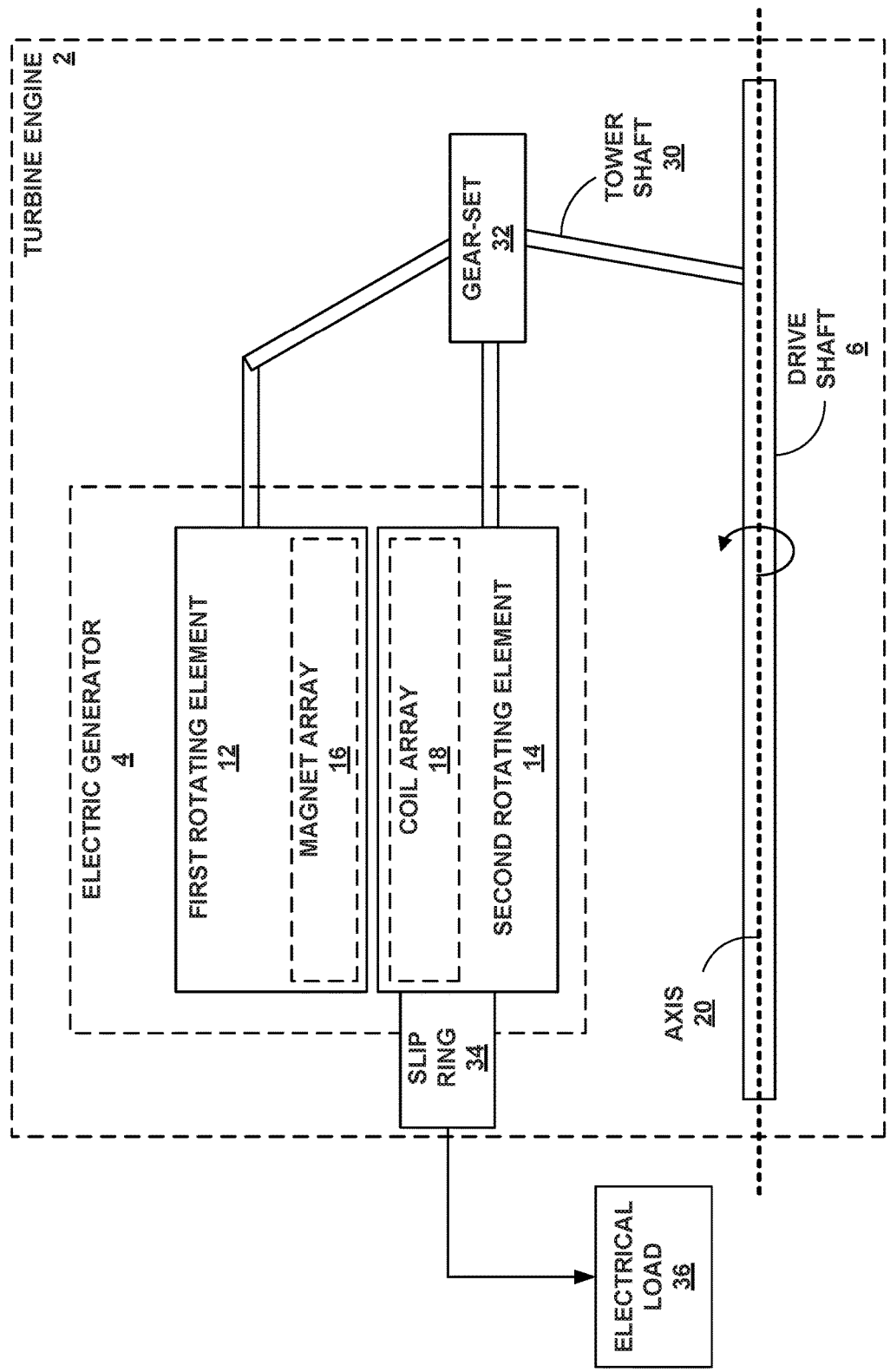
FIG. 2 is a conceptual diagram illustrating further details of the turbine engine of FIG. 1, which may include mechanical coupling from a drive shaft to the electric generator, in accordance with one or more techniques of this disclosure.

FIG. 2 is a conceptual diagram illustrating further details of the turbine engine 2 of FIG. 1, which may include mechanical coupling from a drive shaft 6 to the electric generator 4, in accordance with one or more techniques of this disclosure. In some examples, each of rotating elements 12, 14 may be mechanically coupled to drive shaft 6 by tower shaft 30 and gear-set 32.

Tower shaft 30 is configured to rotate based on the rotation of drive shaft 6. Tower shaft 30 may be mechanically coupled to drive shaft 6 by a gear-set. Tower shaft 30 may deliver mechanical power to electric generator 4 and other components in turbine engine 2. Tower shaft 30 may extend radially away from drive shaft 6 in the Z direction. Tower shaft 30 may also extend partially in the X and Y directions. Tower shaft 30 may extend through or around a compressor and/or inlet duct of turbine engine 2

Gear-set 32 may include one or more gears configured to rotate based on the rotational speeds of drive shaft 6 and/or tower shaft 30. Through gear-set 32, drive shaft 6 and tower shaft 30 may drive the rotation of each of rotating elements 12, 14. Gear-set 32 may mechanically couple two gears and/or shafts to tower shaft 30. Each of the gears and/or shafts may be mechanically coupled to one of rotating elements 12, 14.

The angular velocities of rotating elements 12, 14 may depend on the angular velocity of tower shaft 30 and the sizes and number of teeth of the respective gears in gear-set 32. Rotating element 12 may not necessarily rotate at the same speed as rotating element 14. The relative angular velocity of magnet array 16 with respect to coil array 18 may be equal to the angular velocity of rotating element 12 plus the angular velocity of rotating element 14. It may be desirable in some circumstances to rotate each of rotating elements 12, 14 at similar angular velocities to control the deflections of each of rotating elements 12, 14.

Electric generator 34 may include slip ring 34 for receiving the electrical current produced by coil array 18. Slip ring 34 may transmit the electrical current produced by coil array 18 from rotating element 14 to a stationary object such as an electrical wire or a power converter in or outside of the frame of electric generator 4. The electrical wire may transmit the electrical current to electrical load 36. Slip ring 34 may include one or more brushes and may be electrically connected to rotating element 14 but may not necessarily rotate.

Electrical load 36 may be configured to receive electrical power (e.g., a voltage and a current) produced by electric generator 4. Electrical load 36 may reside within or outside of electric generator 36. In some examples, electrical load 36 may include at least two electrical loads coupled to a power bus. Electrical load 36 may include any type of electrical load, such as a fuel pump, a hydraulic pump, a cabin load, an interior lighting and display system, a heating and cooling system, or other loads added by the system designer.

Figure 3:
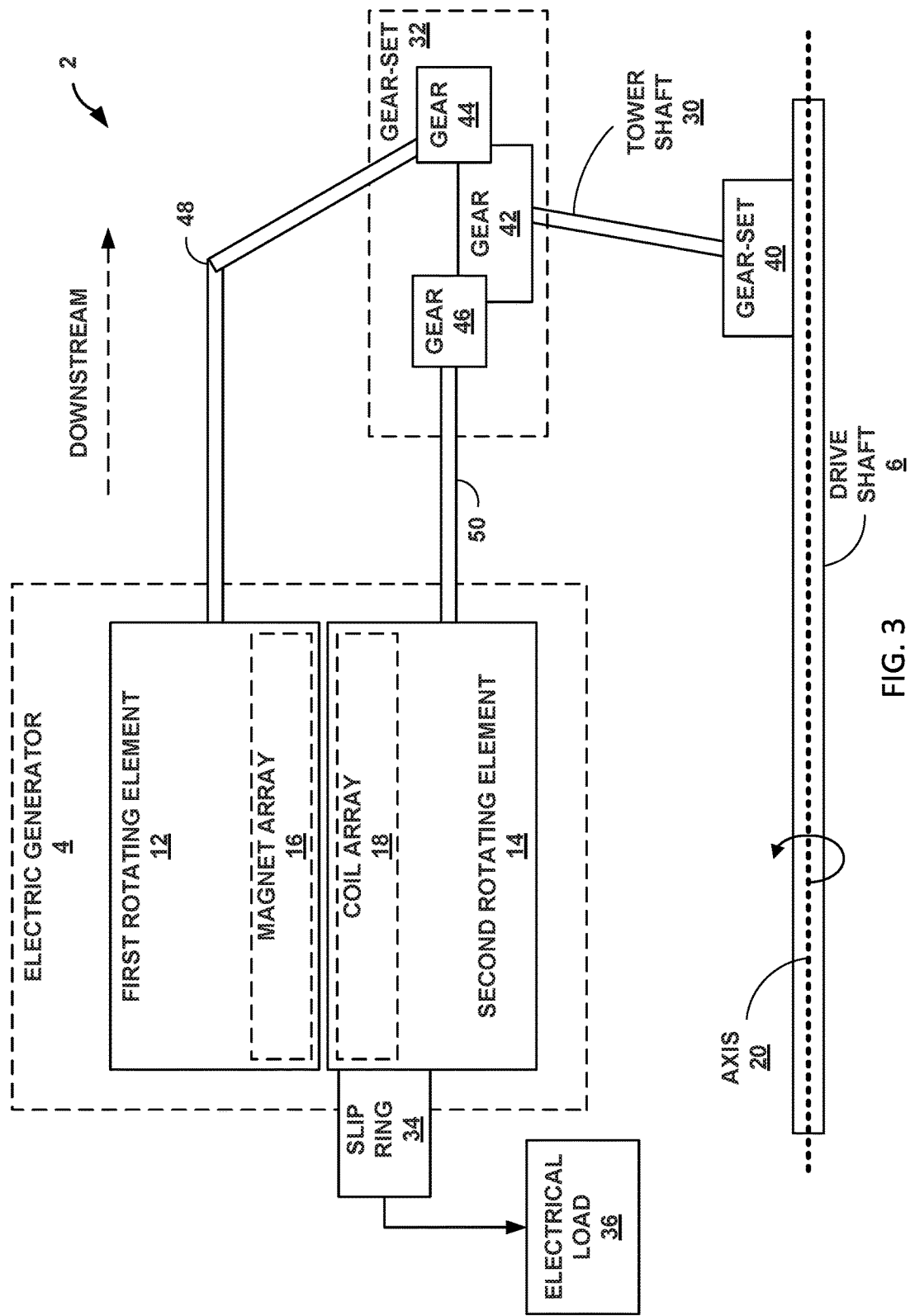
FIG. 3 is a conceptual diagram illustrating further details of the turbine engine of FIGS. 1 and 2, which may include one or more gear-sets, in accordance with one or more techniques of this disclosure.

FIG. 3 is a conceptual diagram illustrating further details of the turbine engine 2 of FIGS. 1 and 2, which may include one or more gear-sets 32, 40, in accordance with one or more techniques of this disclosure. FIG. 3 includes an indication of the downstream direction in turbine engine 2. The downstream direction may correspond to the flow of fluid through turbine engine 2.

As depicted in FIG. 3, tower shaft 30 may be mechanically coupled to drive shaft 6 by gear-set 40. Gear-set 40 may include a planetary gear-set and/or an epicyclic gear for transferring mechanical power from drive shaft 6 to tower shaft 30. In some examples, gear-set 40 may be configured to rotate tower shaft 30 at a slower rate than the rotation of drive shaft 6.

Gear-set 32 may include gear 42 mechanically coupled to tower shaft 30, gear 44 mechanically coupled to shaft 48 and rotating element 12, and gear 46 mechanically coupled to shaft 50 and rotating element 14. Each of gears 44, 46 may rotate at an angular velocity based on the rotation of gear 42 and tower shaft 30 and the respective sizes of gears 42, 44, 46. Shaft 48 may be mechanically coupled to the downstream side of gear 44 and may have the same angular velocity as gear 44. The rotation of rotating element 12 may be based on the rotation of shaft 48 and gear 44. Shaft 50 may be mechanically coupled to the upstream side of gear 46 and may have the same angular velocity as gear 46. The rotation of rotating element 14 may be based on the rotation of shaft 50 and gear 46.

Shaft 48 may be mechanically coupled to rotating element 12 by a gear attached to the housing of rotating element 12. The mechanical coupling between rotating element 12 and shaft 48 may be referred to as meshing. Shaft 50 may be mechanically coupled to rotating element 14 by a gear attached to the housing of rotating element 14.

Figure 4:
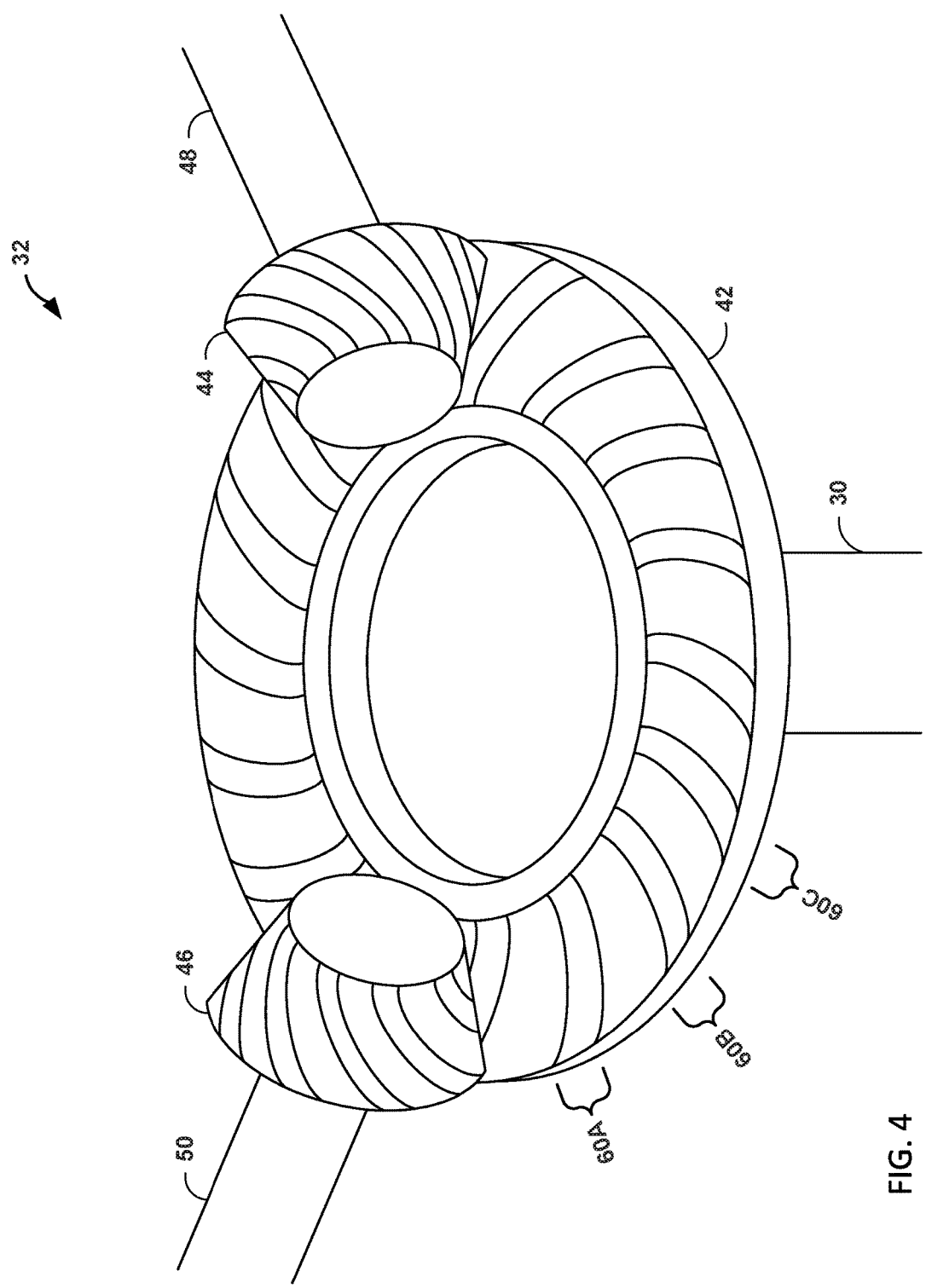
FIG. 4 is an illustration of an example gear-set mechanically coupled to the tower shaft of FIGS. 1-3, which may include a circular gear and two pinions, in accordance with one or more techniques of this disclosure.

FIG. 4 is an illustration of an example gear-set 32 mechanically coupled to the tower shaft 30 of FIGS. 1-3, which may include a circular gear 42 and two pinions 44, 46, in accordance with one or more techniques of this disclosure. The depiction of gear-set 32 in FIG. 4 is an example of the shapes and arrangements of the gears and shafts of gear-set 32. Other shapes and arrangements are possible based on the teachings of this disclosure.

Pinions 44, 46 may also be referred to as "pinion gears." Pinion 44 may be mechanically coupled to one side of circular gear 42, and pinion 46 may be mechanically coupled to the other side of circular gear 42. The rotation of pinion 44 may be an opposite direction of the rotation of pinion 46 because pinions 44, 46 are mechanically coupled to opposing sides of circular gear 42.

Gear 42 may include teeth 60A-60C to allow gear 42 to mesh with pinions 44, 46. Teeth 60A-60C may include raised notches on gear 42 to mesh with the teeth of pinions 44, 46 and cause pinions 44, 46 to rotate. The number of teeth on gear 42 relative to the number of teeth on pinions 44, 46 may affect the angular velocities of pinions 44, 46 relative to the angular velocity of gear 42.

Figure 5:
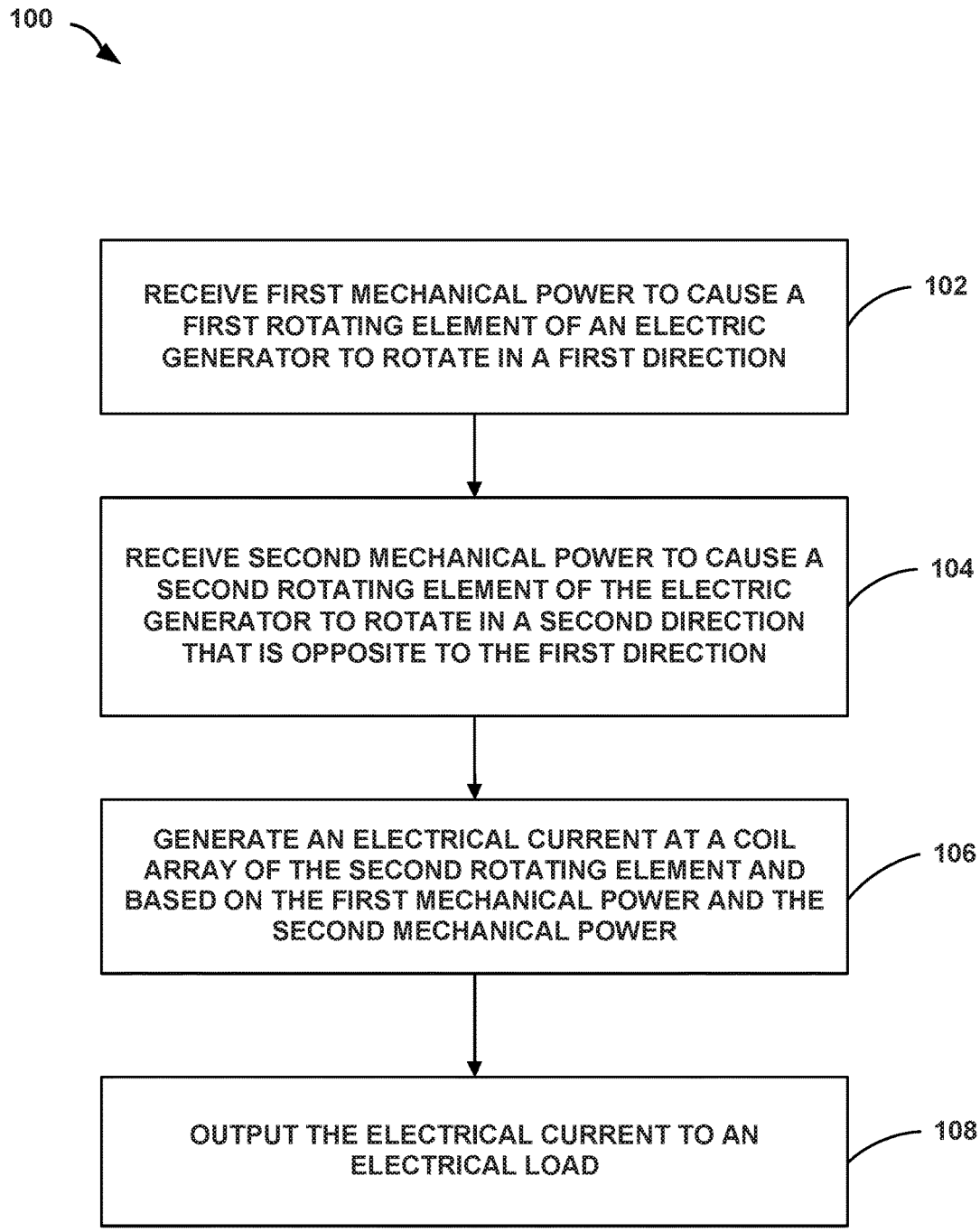
FIG. 5 is a flowchart illustrating an example process implemented by a system including a turbine engine with an electric generator configured to generate, using two counter-rotating elements, an electrical current, in accordance with one or more techniques of this disclosure.

FIG. 5 is a flowchart illustrating an example process 100 implemented by a system including a turbine engine with an electric generator configured to generate, using two counter-rotating elements, an electrical current, in accordance with one or more techniques of this disclosure. Operations 102-108 of process 100 are described in the context of electric generator 4 of FIGS. 1-3.

Process 100 includes receiving, at a first rotating element 12 of an electric generator 4 of a turbine engine 2, via a drive shaft 6 of the turbine engine 2, first mechanical power to cause the first rotating element 12 to rotate in a first direction (102). For example, if turbine engine 2 is part of an aircraft system, turbine engine 2 may spin drive shaft 6 during pre-fight or in-flight operations to provide mechanical power to drive shaft 6. Rotating element 12 of electric generator 4, which may function as a rotor, may receive the mechanical power delivered to drive shaft 6. Rotating element 12 may rotate in a first direction about axis 20, which is depicted as clockwise in FIG. 1.

Process 100 also includes receiving, at a second rotating element 14 of the electric generator 4, via the drive shaft 6, second mechanical power to cause the second rotating element 14 to rotate in a second direction that is opposite to the first direction (104). Rotating element 14, which may function as a rotor, may receive the mechanical power delivered to drive shaft 6. Rotating element 14 may rotate in a direction opposite to the first direction about axis 20, which is depicted as counter-clockwise in FIG. 1.

Process 100 also includes generating, at a coil array 18 of the second rotating element 14 and based on the first mechanical power and the second mechanical power, an electrical current (106). For example, magnet array 16 of rotating element 12 may include a permanent magnet or an electromagnetic configured to induce an electrical current in a coil element of coil array 18. The coil element of coil array 18 may generate an electrical current based on the electromagnetic field created in the coil elements of coil array 18 by magnet array 16.

Process 100 also includes outputting, by an electrical output element of the electric generator 4, to an electrical load 36, the electrical current (108). In some examples, the electrical output element may include slip ring 34 for receiving the electrical current from rotating element 14. The electrical output element may directly transmit the electrical current to electrical load 36 or may transmit the electrical current to a power converter. The power converter may convert the type of electrical current before transmitting the electricity to electrical load 36.

FIG. 5 has described the operation of electric generator 4 in general. In some examples, rotating elements 12, 14 of electric generator 4 may rotate at equal angular velocities and/or equal tangential velocities. The tangential velocity of a magnetic element in magnet array 16 on rotating element 12 may be equal to the radius multiplied by the angular velocity. The radius of the magnetic element may be the distance from the center of the magnetic element to axis 20. For purposes of this disclosure, the same or equal velocity may mean that a slower velocity of two velocities is more than ninety percent as fast as the faster velocity of the two velocities.

As described in process 100, electric generator 4 may convert mechanical power to electrical current at coil array 18. Each of rotating elements 12, 14 may be configured to rotate at in opposite directions, such that the relative velocity of magnet array 16 with respect to coil array 18 is larger than the velocity of either magnet array 16 or coil array 18. Electric generator 4 may achieve a desired relative velocity by rotating each of rotating elements 12, 14 at velocities that are much lower than the desired relative velocity. Thus, the deflection of each of rotating elements 12, 14 may be less than the deflection of a rotating element of another turbine engine with only one rotating element and the same relative velocity.

The following numbered examples demonstrate one or more aspects of the disclosure.

EXAMPLE 1

A turbine engine includes a drive shaft and an electric generator comprising a first rotating element comprising a magnet array, wherein the first rotating element is configured to rotate in a first direction based on a rotation of the drive shaft. The turbine engine further includes a second rotating element comprising a coil array, wherein the second rotating element is configured to rotate in a second direction based on the rotation of the drive shaft, wherein the second direction is opposite to the first direction.

EXAMPLE 2

The turbine engine of example 1, further comprising a slip ring configured to output electrical current generated by the coil array.

EXAMPLE 3

The turbine engine of examples 1 or 2 or any combination thereof, further comprising a tower shaft mechanically coupled to the drive shaft, wherein the first rotating element is mechanically coupled to the tower shaft, and the second rotating element is mechanically coupled to the tower shaft.

EXAMPLE 4

The turbine engine of examples 1 to 3 or any combination thereof, further comprising a planetary gear-set, wherein the tower shaft is mechanically coupled to the drive shaft by at least the planetary gear-set. The drive shaft is configured to rotate at a first angular velocity. The tower shaft is configured to rotate at a second angular velocity that is lower than the first angular velocity of the drive shaft.

EXAMPLE 5

The turbine engine of examples 1 to 4 or any combination thereof, wherein the first rotating element is mechanically coupled to the tower shaft by at least a gear-set. The second rotating element is mechanically coupled to the tower shaft by at least the gear-set.

EXAMPLE 6

The turbine engine of examples 1 to 5 or any combination thereof, wherein the gear-set comprises a gear mechanically coupled to the tower shaft, a first pinion mechanically coupled to the first rotating element, and a second pinion mechanically coupled to the second rotating element. The first rotating element is mechanically coupled to the tower shaft by at least the first pinion mechanically coupled to the gear. The second rotating element is mechanically coupled to the tower shaft by at least the second pinion mechanically coupled to the gear.

EXAMPLE 7

The turbine engine of examples 1 to 6 or any combination thereof, wherein the first pinion is mechanically coupled to a first side of the gear and configured to rotate in a third direction. The second pinion is mechanically coupled to a second side of the gear and configured to rotate in a fourth direction that is opposite to the third direction.

EXAMPLE 8

The turbine engine of examples 1 to 7 or any combination thereof, wherein the magnet array is configured to rotate at a particular tangential velocity, and the coil array is configured to rotate at approximately the particular tangential velocity of the magnet array.

EXAMPLE 9

The turbine engine of examples 1 to 8 or any combination thereof, wherein the first rotating element is configured to rotate at a first angular velocity, the second rotating element is configured to rotate at a second angular velocity, and the angular velocity of the first rotating element relative to the second rotating element is a sum of the first angular velocity and the second angular velocity.

EXAMPLE 10

A method includes receiving, at a first rotating element of an electric generator of a turbine engine, via a drive shaft of the turbine engine, first mechanical power to cause the first rotating element to rotate in a first direction. The method further includes receiving, at a second rotating element of the electric generator, via the drive shaft, second mechanical power to cause the second rotating element to rotate in a second direction that is opposite to the first direction. The method further includes generating, at a coil array of the second rotating element and based on the first mechanical power and the second mechanical power, an electrical current. The method further includes outputting, by an electrical output element of the electric generator, to an electrical load, the electrical current.

EXAMPLE 11

The method of example 10, wherein the electrical output element comprises a slip ring electrically connected to the coil array.

EXAMPLE 12

The method of examples 10 or 11 or any combination thereof, wherein receiving the first mechanical power comprises receiving, at the first rotating element, via a tower shaft mechanically coupled to the drive shaft, the first mechanical power. In addition, receiving the second mechanical power comprises receiving, at the second rotating element, via the tower shaft, the second mechanical power.

EXAMPLE 13

The method of examples 10 or 12 or any combination thereof, wherein the tower shaft is mechanically coupled to the drive shaft by a planetary gear-set of the turbine engine. The planetary gear-set is configured to rotate the tower shaft at an angular velocity that is lower than an angular velocity of the drive shaft.

EXAMPLE 14

The method of examples 10 to 13 or any combination thereof, wherein receiving the first mechanical power comprises receiving, at the first rotating element, via a gear-set mechanically coupled to the tower shaft, the first mechanical power. In addition, receiving the second mechanical power comprises receiving, at the second rotating element, via the gear-set, the second mechanical power.

EXAMPLE 15

The method of examples 10 to 14 or any combination thereof, wherein receiving the first mechanical power comprises receiving, at the first rotating element, via a first pinion of the gear-set mechanically coupled to a gear of the gear-set, the first mechanical power. In addition, receiving the second mechanical power comprises receiving, at the second rotating element, via a second pinion of the gear-set mechanically coupled to the gear of the gear-set, the second mechanical power. The gear is mechanically coupled to the tower shaft, and the first pinion is mechanically coupled to a first side of the gear and configured to rotate in a third direction. The second pinion is mechanically coupled to a second side of the gear and configured to rotate in a fourth direction that is opposite to the third direction.

EXAMPLE 16

The method of examples 10 to 15 or any combination thereof, wherein receiving the first mechanical power comprises rotating a magnet array of the first rotating element at a particular tangential velocity. In addition, receiving the second mechanical power comprises rotating the coil array at approximately the particular tangential velocity of the magnet array.

EXAMPLE 17

An electric generator module comprising a first rotating element comprising a magnet array and configured to mechanically couple to a drive shaft of the turbine engine, receive first mechanical power from the drive shaft, and rotate in a first direction based on a rotation of the drive shaft. The electric generator module further comprises a second rotating element comprising a coil array and configured to mechanically couple to the drive shaft, receive second mechanical power from the drive shaft, and rotate in a second direction based on a rotation of the drive shaft, wherein the second direction is opposite to the first direction. The electric generator module further comprises an electrical output element configured to output an electrical current produced by the coil array to an electrical load.

EXAMPLE 18

The electric generator module of example 17, wherein the electrical output element comprises a slip ring configured to receive the electrical current from the coil array.

EXAMPLE 19

The electric generator module of examples 17 or 18 or any combination thereof, wherein the first rotating element is configured to mechanically couple to the drive shaft by at least a first pinion of a gear-set, wherein the first pinion is mechanically coupled to a tower shaft that is mechanically coupled to the drive shaft. The second rotating element is configured to mechanically couple to the drive shaft by at least a second pinion of the gear-set, wherein the second pinion that is mechanically coupled to the drive shaft.

EXAMPLE 20

The electric generator module of examples 17 to 19 or any combination thereof, wherein the first rotating element is configured to mechanically couple to a tower shaft that is mechanically coupled to the drive shaft by at least the first pinion that is mechanically coupled to a first side of a gear of the gear-set. The second rotating element is configured to mechanically couple to the tower shaft by at least the second pinion that is mechanically coupled to a second side of the gear.

Various examples have been described. These and other examples are within the scope of the following claims.

What is claimed is:

1. A turbine engine comprising:
    a compressor;
    a turbine;
    a drive shaft coupled to the compressor and the turbine, wherein the turbine is configured to drive the compressor via the drive shaft;
    a tower shaft mechanically coupled to the drive shaft, wherein the tower shaft extends radially away from the drive shaft and wherein the tower shaft is driven by the drive shaft; and
    an electric generator comprising:
        a first rotating element comprising a magnet array, wherein the first rotation element is mechanically coupled to the tower shaft, and wherein the second rotating element is configured to rotate in a first direction coaxial with the drive shaft based on a rotation of the tower shaft, and
        a second rotating element comprising a coil array wherein the second rotating element is mechanically coupled to the tower shaft, and wherein the second rotating element is configured to rotate in a second direction coaxial with the drive shaft based on the rotation of the tower shaft, wherein the second direction is opposite to the first direction.

2. The turbine engine of claim 1, further comprising a slip ring configured to output electrical current generated by the coil array.

3. The turbine engine of claim 1, further comprising a planetary gear-set, wherein:
    the tower shaft is mechanically coupled to the drive shaft by at least the planetary gear-set;
    the drive shaft is configured to rotate at a first angular velocity; and
    the tower shaft is configured to rotate at a second angular velocity that is lower than the first angular velocity of the drive shaft.

4. The turbine engine of claim 1, wherein:
    the first rotating element is mechanically coupled to the tower shaft by at least a gear-set; and
    the second rotating element is mechanically coupled to the tower shaft by at least the gear-set.

5. The turbine engine of claim 4, wherein:
    the gear-set comprises:
        a gear mechanically coupled to the tower shaft,
        a first pinion mechanically coupled to the first rotating element, and
        a second pinion mechanically coupled to the second rotating element;
    the first rotating element is mechanically coupled to the tower shaft by at least the first pinion mechanically coupled to the gear; and
    the second rotating element is mechanically coupled to the tower shaft by at least the second pinion mechanically coupled to the gear.

6. The turbine engine of claim 5, wherein:
    the first pinion is mechanically coupled to a first side of the gear and configured to rotate in a third direction; and
    the second pinion is mechanically coupled to a second side of the gear and configured to rotate in a fourth direction that is opposite to the third direction.

7. The turbine engine of claim 1, wherein:
    the magnet array is configured to rotate at a particular tangential velocity; and
    the coil array is configured to rotate at the particular tangential velocity of the magnet array.

8. The turbine engine of claim 1, wherein:
    the first rotating element is configured to rotate at a first angular velocity;
    the second rotating element is configured to rotate at a second angular velocity; and
    the angular velocity of the first rotating element relative to the second rotating element is a sum of the first angular velocity and the second angular velocity.

9. A method for generating an electrical current with a turbine engine having an electric generator, the gas turbine engine comprising a compressor, a turbine, a drive shaft coupled to the compressor and the turbine, wherein the turbine is configured to drive the compressor via the drive shaft, a tower shaft mechanically coupled to the drive shaft, wherein the tower shaft extends radially away for the drive shaft and where in the tower shaft is driven by the drive shaft; and wherein the electric generator comprises a first rotating element comprising a magnet array, wherein the first rotating element is mechanically coupled to the tower shaft, and wherein the first rotating element is configured to rotate in the a first direction coaxial with the drive shaft based on a rotation of the tower shaft, wherein the electric generator further comprises a second rotating element comprising a coil array, wherein the second rotating element is mechanically coupled to the tower shaft, and wherein the second rotating element is configured to rotate in a second direction coaxial with the drive shaft based on the rotation of the tower shaft, wherein the second direction is opposite to the first direction, the method comprising:
    receiving, at the first rotating element of the electric generator of the turbine engine, via the tower shaft, first mechanical power to cause the first rotating element to rotate in the first direction coaxial with the drive shaft;
    receiving, at the second rotating element of the electric generator, via the tower drive shaft, second mechanical power to cause the second rotating element to rotate in the second direction that is opposite to the first direction coaxial with the drive shaft;
    generating, at the coil array of the second rotating element and based on the first mechanical power and the second mechanical power, the electrical current; and
    outputting, by an electrical output element of the electric generator, to an electrical load, the electrical current.

10. The method of claim 9, wherein the electrical output element comprises a slip ring electrically connected to the coil array.

11. The method of claim 9, wherein:
    the tower shaft is mechanically coupled to the drive shaft by a planetary gear-set of the turbine engine; and
    the planetary gear-set is configured to rotate the tower shaft at an angular velocity that is lower than an angular velocity of the drive shaft.

12. The method of claim 9, wherein:
    receiving the first mechanical power comprises receiving, at the first rotating element, via a gear-set mechanically coupled to the tower shaft, the first mechanical power; and
    receiving the second mechanical power comprises receiving, at the second rotating element, via the gear-set, the second mechanical power.

13. The method of claim 12, wherein:
    receiving the first mechanical power comprises receiving, at the first rotating element, via a first pinion of the gear-set mechanically coupled to a gear of the gear-set, the first mechanical power; and
    receiving the second mechanical power comprises receiving, at the second rotating element, via a second pinion of the gear-set mechanically coupled to the gear of the gear-set, the second mechanical power, wherein:
the gear is mechanically coupled to the tower shaft,
the first pinion is mechanically coupled to a first side of the gear and configured to rotate in a third direction, and
the second pinion is mechanically coupled to a second side of the gear and configured to rotate in a fourth direction that is opposite to the third direction.

14. The method of claim 9, wherein:
receiving the first mechanical power comprises rotating a magnet array of the first rotating element at a particular tangential velocity; and
receiving the second mechanical power comprises rotating the coil array at approximately the particular tangential velocity of the magnet array.

15. The turbine engine of claim 1,
wherein the first rotating element is configured to rotate in the first direction about an axis passing through a center of the drive shaft, and
wherein the second rotating element is configured to rotate in the second direction about the axis passing through the center of the drive shaft.

* * * * *

UNITED STATES PATENT AND TRADEMARK OFFICE
CERTIFICATE OF CORRECTION

PATENT NO. : 10,513,986 B2
APPLICATION NO. : 15/286185
DATED : December 24, 2019
INVENTOR(S) : Auker et al.

It is certified that error appears in the above-identified patent and that said Letters Patent is hereby corrected as shown below:

In the Claims

Column 11, Line 14 (Claim 1): Replace "wherein the first rotation element" with --wherein the first rotating element--

Column 11, Line 15 (Claim 1): Replace "wherein the second rotating element" with --wherein the first rotating element--

Column 11, Line 19 (Claim 1): Replace "comprising a coil array wherein" with --comprising a coil array, wherein--

Column 12, Line 21 (Claim 9): Replace "in the a first direction" with --in a first direction--

Signed and Sealed this
Eighth Day of December, 2020

Andrei Iancu
*Director of the United States Patent and Trademark Office*